(No Model.) 4 Sheets—Sheet 2.
M. T. COLLINS.
MACHINE FOR SHAPING THE ENDS OF SUCKER RODS.

No. 328,383. Patented Oct. 13, 1885.

Witnesses
W. R. Edelin.
E. E. Masson

Inventor
Michael T. Collins
Per James C. Boyce
Att'y

N. PETERS, Photo-Lithographer, Washington, D. C.

(No Model.) 4 Sheets—Sheet 3.
M. T. COLLINS.
MACHINE FOR SHAPING THE ENDS OF SUCKER RODS.
No. 328,383. Patented Oct. 13, 1885.
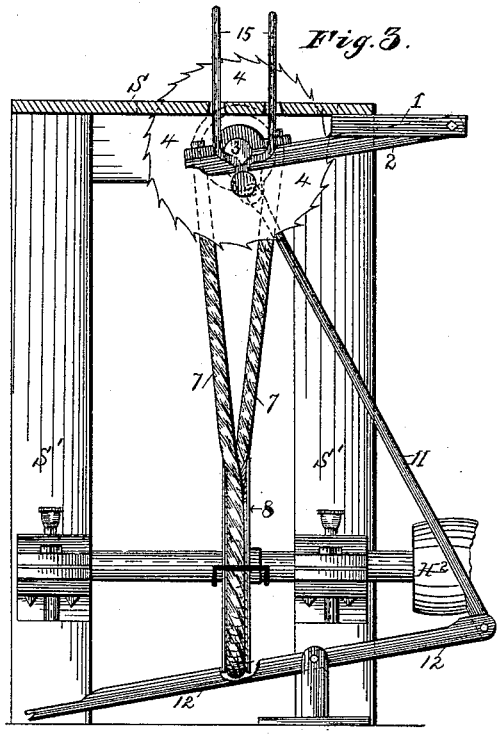
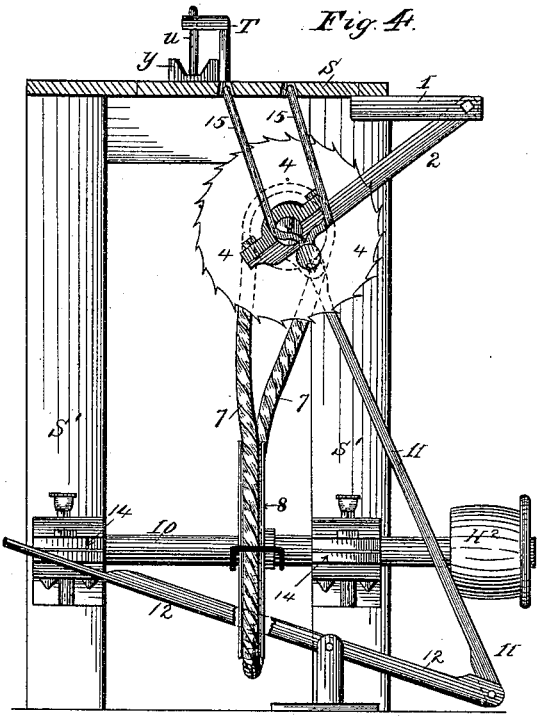
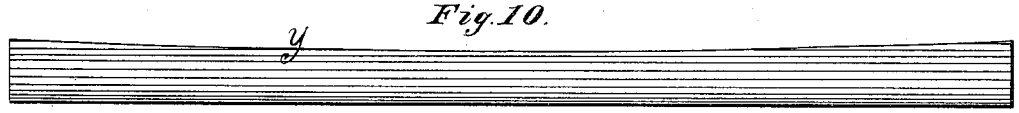
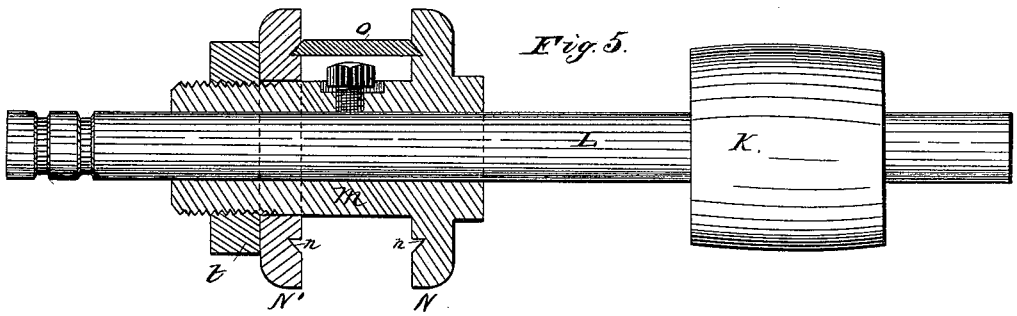
Witnesses
W. R. Edelen.
E. E. Masson
Inventor
Michael T. Collins,
Per James C. Boyce
Att'y (No Model.) 4 Sheets—Sheet 4.
M. T. COLLINS.
MACHINE FOR SHAPING THE ENDS OF SUCKER RODS.
No. 328,383. Patented Oct. 13, 1885.
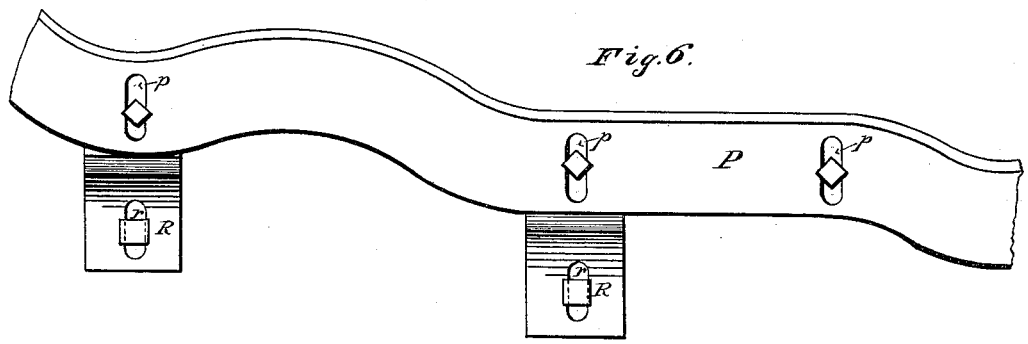
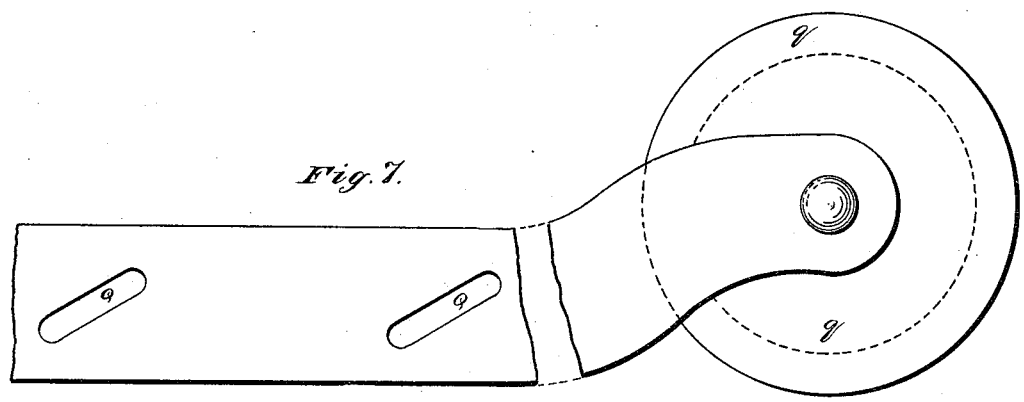
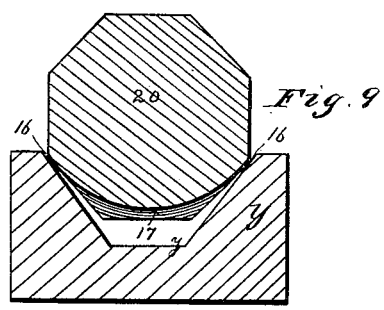
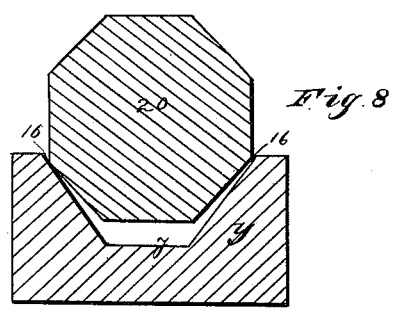
Witnesses
W. R. Edelen
E. E. Masson
Inventor
Michael T. Collins
Per James C. Boyce
Atty.

UNITED STATES PATENT OFFICE.

MICHAEL T. COLLINS, OF OIL CITY, PENNSYLVANIA.

MACHINE FOR SHAPING THE ENDS OF SUCKER-RODS.

SPECIFICATION forming part of Letters Patent No. 328,383, dated October 13, 1885.

Application filed December 27, 1882. Serial No. 80,312. (No model.)

*To all whom it may concern:*

Be it known that I, MICHAEL T. COLLINS, of Oil City, in the county of Venango and State of Pennsylvania, have invented certain new and useful Improvements in Shapers for the Ends of Sucker-Rods; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in machines for shaping the ends of sucker-rods so as to fit them for the iron straps by which two rods are connected together.

The object of my improvement is to provide a machine by which any defective ends of sucker-rods can be readily cut off and also be trimmed and shaped down quickly to the proper size. I attain these objects by the mechanism illustrated in the accompanying drawings, in which—

Figure 1:
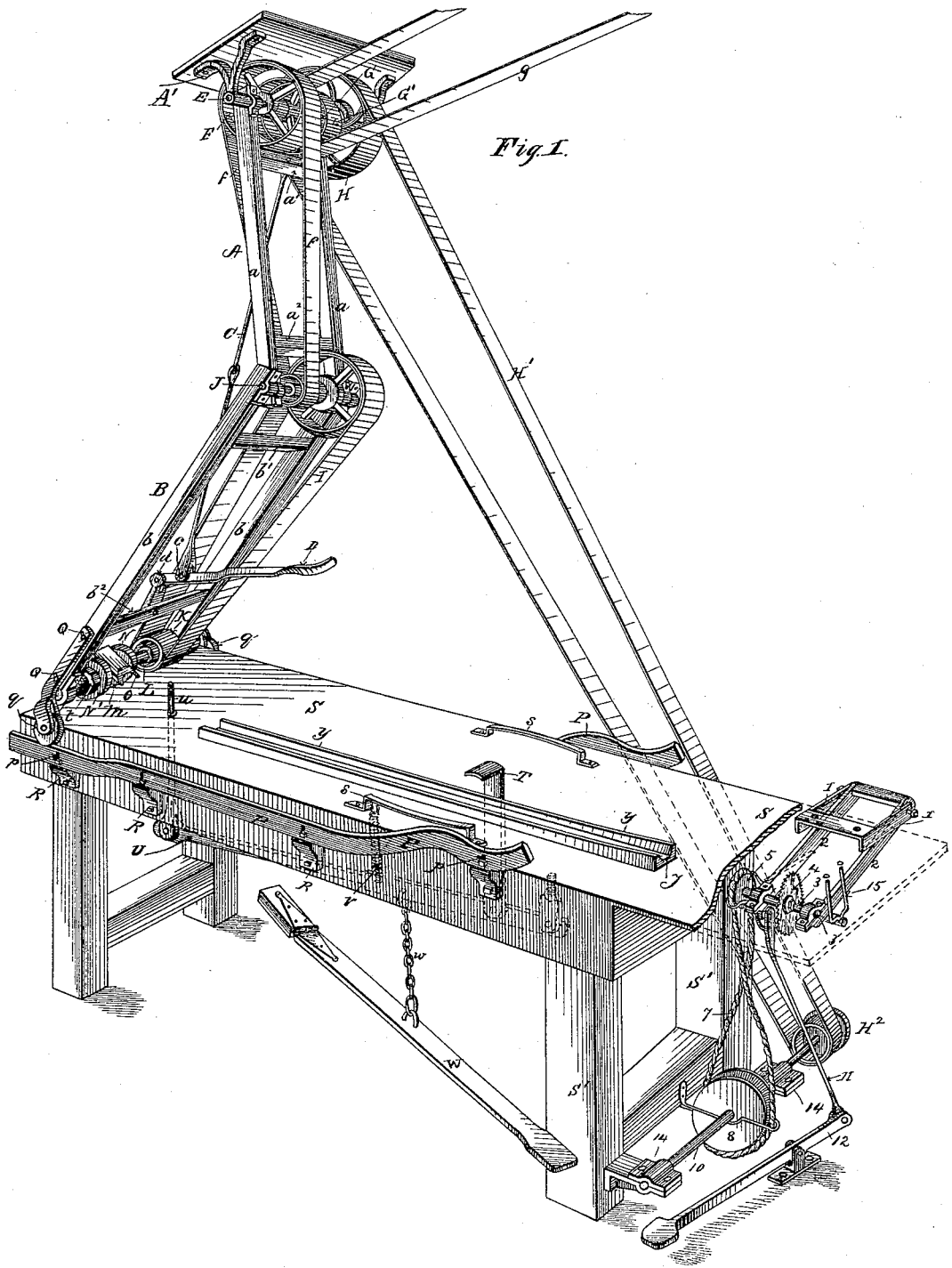
Figure 2:
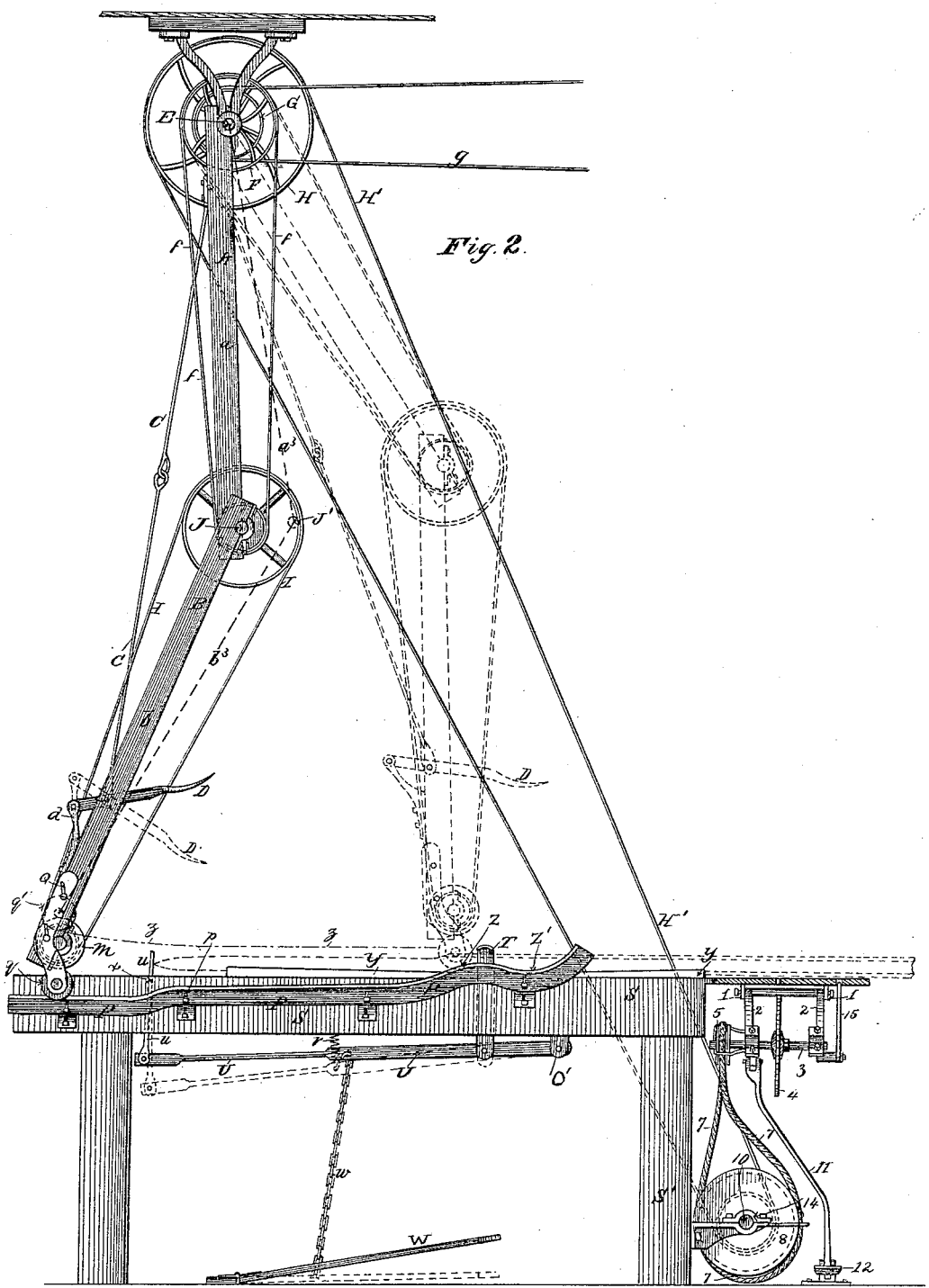

Figure 1 is a perspective view of the entire machine with part of the bench or table broken away to show the saw attachments. Fig. 2 is a side elevation of the machine with a hanger shown in full and dotted lines in different positions. Fig. 3 is an end view of the sawing device with the bench or table partly in section and the saw and guide-prongs thrown upward beyond the surface of the table. Fig. 4 is a similar view with the saw thrown downward beneath the table. Fig. 5 is a side elevation of the cutter-head mandrel, the cutter-head being shown in section. Fig. 6 is an enlarged view of part of the adjustable molding-track and adjustable brackets. Fig. 7 is a side elevation of the sheave with its arm on a large scale, and showing the angular slots provided for adjustment. Fig. 8 is a cross-section of a sucker-rod and the bed in which it rests for the purpose of being operated upon before said sucker-rod is shaped or reduced. Fig. 9 is a section of the same with one side of the sucker-rod reduced and the rod turned in its bed so that the shaped side is downward. Fig. 10 is a side elevation of the sucker-rod bed, showing its slight concavity in the middle of its length.

In the drawings, the hangers A and B are composed of parallel beams $a$ and $b$, united in pairs by means of cross-bars $a'$ $a^2$ $b'$ $b^2$. They are suspended from a counter-shaft, E, secured to a ceiling or to a high frame, and carry an intermediate counter-shaft, J. The counter-shaft E is supported by appropriate bearings in the hangers A', and the counter-shaft J forms the hinge between the hangers A and B. These hangers are held together in a position slightly crooked at the elbow or joint J by means of the tie-rod C, the upper end of which is secured to the cross-tie $a'$ on the hanger A, and the lower end at $c$ to the hand-lever D, and said lever D is fulcrumed to the arm $d$, which is secured to the cross-tie $b^2$ of the hanger B. The lowermost end of the hanger B is provided with grooved sheaves $q$, which rest on an adjustable molding or shaping track, P, said track being supported and retained on adjustable brackets R, which are secured to the opposite sides of the bench or table S. On the lower end of the hanger B is the device used to operate upon and give shape to sucker-rods. It consists of an ordinary shaft or mandrel, L, mounted in bearings secured to said hanger. This mandrel L is provided with a pulley, K, and a cutter-head, $m$, to which are firmly secured, between the flanges N N', in suitable grooves, $n$, the cutters O, one of which is shown in section in Fig. 5 of the accompanying drawings. The bench S is provided with arc-shaped guards $s$ $s$, to prevent the sheaves $q$ from running off the tracks P where these tracks are above the level of the bench. This bench or table S is also provided with a grooved cast-iron bed, $y$, its groove being in the form of a half-hexagon, and the central portion of its length is somewhat lower than the ends, to nearly conform to the finished surface of a trimmed sucker-rod and thereby steady it upon the bed. The curve being slight may not be observed unless magnified, as in Fig. 10. Passing through the bench S there is a clamp, T, and the vertical stop-rod $u$, pivoted to a horizontal lever, U, and the latter is pivoted at its end O' to the under side of the bench. This lever U is provided with a tension-spring, $v$, to raise said lever and its treadle W, the two being connected by the chain $w$. This treadle is used for depressing and drawing the clamp T firmly against the material or rod to be operated upon.

The front end of the bench S is shown broken away in Fig. 1, to more fully illustrate some parts of the mechanism. Suspended and secured to the under side of the table there is a bracket having arms 1 1, to which is pivoted one end of a hanger, 2, provided with bearings to carry a circular-saw arbor, 3, which is provided with the guide-prongs 15, the saw 4, and pulley 5. The hanger 2 is supported at its front or lower end by means of a stiff pitman, 11, having its lower end secured to a treadle, 12, by means of which said saw 4, prongs 15, and pulley 5 can be raised until the tension of the belt 7, passing over the pulley 5, prevents any farther upward movement when pressing upon the free end of the treadle 12. Secured to the legs S' of the table S are bracket-boxes carrying a shaft, 10, upon which the pulleys 8 and $H^2$ are mounted. Said shaft 10 is kept in constant rotation by means of the belt H', which connects the pulley $H^2$ with the pulley H on the counter-shaft E. By this arrangement the saw 4 can be put in motion or stopped by means of treadle 12. When this sawing device is not in use, it assumes the position shown in Figs. 1, 2, and 4, and when in use it is raised and retained in that position by means of the treadle 12 and pitman 11, which throw the guide-prongs 15 several inches upward through perforations in the bench S before the saw 4 projects through, and then the saw is elevated to the utmost limit allowed by the belt 7. The latter, acting upon pulley 5, sets the saw in motion. This saw is used, as shown in Fig. 3, only when a knotty or defective end is to be removed. The object of the prongs 15 coming through the table S before the saw is to receive and hold the sucker-rod between said prongs in position for the saw to act upon.

The power-giving belt $g$, connecting with the tight and loose pulleys G and G', imparts motion to pulley F and also to belt $f$, which communicates motion to counter-shaft J by means of the pulleys on said shaft, and from thence by means of belt I to pulley K on the mandrel L, thus revolving the cutter from thirty to thirty-five hundred revolutions per minute, and said cutter is constantly revolving whatever may be the position of the hangers A and B.

When it is desired to shave, reduce, or form the end of a sucker-rod, as shown in dotted lines in Fig. 2, the rod is placed in the iron bed $y$ and pushed forward until it comes in contact with the vertical gage or stop-pin $u$. The operator then depresses the treadle W, which draws the stop-pin below the surface of the table, as shown at $x$ in Fig. 2, and at the same time the clamping device T, attached to the same lever U, is drawn firmly upon the sucker-rod. While the operator is keeping the sucker-rod firmly clamped by means of treadle W, as before stated, if he presses on the hand-lever D until it assumes the position shown in dotted lines, the line of centers, and also the hangers A and B, are thereby thrown in the position shown by the heavy dotted line $a^3$ $b^3$, which brings the center of counter-shaft J to the point J' of the dotted line and the sheave $q$, as shown in the dotted lines at $q'$. The hanger B is then grasped by the left hand of the operator, while the lower end of said hanger is in its present elevated position, and drawn over the table S in the track of the dot-and-dash line $z$ until it strikes the raised portion of the track at Z, as shown in dotted lines. The operator then releases the hand-lever D, and the weight of the hanging frame B rests on the shaping-tracks P. He then pushes the hanger B steadily toward the left of the machine, and its cutter shapes the end of the sucker-rod, as shown in dotted lines, after which, the operator releasing the treadle W, its spring $v$ draws it upward, at the same time elevating the stop-pin $u$ in position to arrest the same rod after it has been turned over, or another rod to be operated upon. The object of the concavity Z' in the rear end of the track P is to allow the sheaves $q$ to rest therein, as it is found desirable while adjusting parts of the machinery, as the hangers are too heavy to hold on the incline Z.

Figs. 8 and 9 show a sucker-rod, 20, and its bed $y$. In Fig. 8 the angular points 16 on the sucker-rod come a very short distance below the top surface of the bed when in position to be trimmed. In Fig. 9 the under side of the rod is shown as having been cut away in an arc-shaped cone, 17, and it will be observed that the angles 16 on the sucker-rod still remain untouched by the cutter, the object of which is to prevent the removal of more wood from one side of the rod than from the other, which would happen if the angles were in the least reduced and the rod was sinking deeper into the bed.

The shaping-track P is provided with vertical slots $p$ to adjust it, as it may be desirable to remove more of the wood either adjacent to the body or at the point of sucker-rods. The arms carrying the sheaves $q$ are also provided with slots Q, that are necessary when the depth of the cut is to be regulated.

The mandrel L shown in Fig. 5 has the cutter-head $m$ secured thereon by a set-screw, and said cutter-head is provided with a grooved head, N, at one end and a loose flange or collar, N', at the other, which is forced up by a nut, $t$, upon the screw-threaded end of the head $m$, by which means the cutters O are secured in the grooves $n$ $n$ between the flanges N and N'. The molding or cutting blades are thus secured rigidly to the head. The cutters operating upon the sucker-rod lengthwise and in the direction of the grain of the wood a better result is obtained than if the cutters were acting around it and across the fibers; and as the chips are not thrown toward the operator he can watch the progress of the tool without difficulty.

Having now fully described my invention, I claim—

1. In a machine for shaping the ends of sucker-rods, the combination of a swinging frame carrying revolving cutters, a table provided with a grooved bed, two curved tracks on the sides of said table, the lever U, pivoted at one end to the under side of the table, its clamp T, passing therethrough, and a treadle connected with the lever U, substantially as and for the purpose described.

2. The combination of a table, two curved tracks on the sides thereof, and a hanger having revolving cutters and the sheaves adapted to follow said tracks with the bed $y$ and horizontal lever U, carrying a vertical stop-pin, $u$, and treadle W, substantially as and for the purposes set forth.

3. The combination of a table provided with grooved bed $y$ and adjustable side tracks with hanger B, carrying revolving cutters and the sheaves $q$ and hinged at J to hanger A, substantially as and for the purpose described.

4. The combination, with table S and side guides P, of hangers A and B, elbow-jointed at J, and tie-rods C, uniting said hangers and hand-lever D with revolving cutters upon the lower hanger, substantially as and for the purpose described.

5. The combination of a table, its grooved bed $y$, vertical stop-rod $u$, clamp T, lever U, carrying said clamp and stop-rod, and the treadle W, controlling said lever, with a saw capable of rotation across the axis of said grooved bed, a saw-support hinged to the table, and a treadle and pitman connected with said support, whereby the sawing mechanism is adapted to be retained alternately under and above the surface of said table, substantially as and for the purpose described.

In testimony that I claim the foregoing as my own, I have hereto affixed my signature in presence of two witnesses.

MICHAEL T. COLLINS.

Witnesses:
JAMES C. BOYCE,
T. A. McALLISTER.